(12) United States Patent
Corvini et al.

(10) Patent No.: US 11,287,308 B2
(45) Date of Patent: Mar. 29, 2022

(54) WEIGHING PLATFORM FOR LIVESTOCK SCALE

(71) Applicant: Robert Bosch Limitada, Campinas-SP (BR)

(72) Inventors: André Rafael Corvini, Valinhos (BR); Alvaro Augusto Vasconcelos, Campinas (BR)

(73) Assignee: ROBERT BOSCH LIMITADA, Campinas-SP (BR)

( * ) Notice: Subject to any disclaimer, the term of this patent is extended or adjusted under 35 U.S.C. 154(b) by 0 days.

(21) Appl. No.: 16/767,025

(22) PCT Filed: Nov. 27, 2018

(86) PCT No.: PCT/BR2018/050440
§ 371 (c)(1),
(2) Date: May 26, 2020

(87) PCT Pub. No.: WO2019/100136
PCT Pub. Date: May 31, 2019

(65) Prior Publication Data
US 2021/0010853 A1    Jan. 14, 2021

(30) Foreign Application Priority Data
Nov. 27, 2017   (BR) ...................... 10 2017 025347 3

(51) Int. Cl.
*G01G 21/22*   (2006.01)
*G01G 17/08*   (2006.01)
*G01G 21/23*   (2006.01)

(52) U.S. Cl.
CPC ............. *G01G 21/22* (2013.01); *G01G 17/08* (2013.01); *G01G 21/23* (2013.01)

(58) Field of Classification Search
CPC ......... G01G 17/08; G01G 21/22; G01G 21/23
See application file for complete search history.

(56) References Cited

U.S. PATENT DOCUMENTS 4,066,140 A * 1/1978 Conley ................ G01G 19/021
177/134
4,203,497 A * 5/1980 Harris .................. G01G 19/025
177/134
(Continued)

FOREIGN PATENT DOCUMENTS

CN    1598500 A    3/2005
FR    2581185 A1   10/1986

OTHER PUBLICATIONS

Written Opinion for Application No. PCT/BR2018/050440 dated Mar. 6, 2019 (6 pages).
(Continued)

*Primary Examiner* — Randy W Gibson
(74) *Attorney, Agent, or Firm* — Michael Best & Friedrich LLP

(57) ABSTRACT

This invention relates to a weighing platform, particularly used in the livestock sector, formed by a base plate (1), which is constituted by a first upper surface (2) and a second lower surface (3), the second surface (3) being provided with a plurality of first bars (31) with an I-shaped cross-section, which are arranged parallel to the longitudinal axis and fixed on the second surface (3), the first bars (31) being aligned in parallel and arranged spaced apart from each other, with the platform having a functional design capable of imparting a ciliary movement, necessary to prevent dirt from settling on the platform, as well as to guarantee the necessary resistance to confer excellent durability to the platform.

8 Claims, 3 Drawing Sheets

(56) References Cited

U.S. PATENT DOCUMENTS

| | | | | |
|---|---|---|---|---|
| 4,304,821 A | * | 12/1981 | Hayase | B21D 26/055 |
| | | | | 156/79 |
| 4,453,606 A | * | 6/1984 | Mokhbery | G01G 21/23 |
| | | | | 177/126 |
| 4,733,736 A | | 3/1988 | Holtgreven et al. | |
| 4,800,971 A | * | 1/1989 | Dillon | G01G 19/02 |
| | | | | 177/134 |
| 4,850,441 A | | 7/1989 | Mosdal | |
| 4,887,678 A | * | 12/1989 | Largenton | G01G 21/22 |
| | | | | 177/134 |
| 6,046,412 A | * | 4/2000 | Rockwell | G01G 21/23 |
| | | | | 177/133 |
| 2018/0340817 A1 | * | 11/2018 | Kroll | G01G 19/022 |

OTHER PUBLICATIONS

International Search Report for Application No. PCT/BR2018/050440 dated Mar. 6, 2019 (6 pages).

* cited by examiner

WEIGHING PLATFORM FOR LIVESTOCK SCALE

BACKGROUND

This invention relates to a weighing platform particularly used in the livestock sector.

Weighing platforms are devices that optimize the weighing of animals. Weighing platforms usually accommodate weighing bars that are positioned under their structures and are applied in several areas, including in the agricultural sector, where there is a need to weigh animals frequently, accurately and in large quantities, which requires the use of robust, precise and durable equipment.

Due to the different places where weighing platforms can be applied (for instance, in open fields, exposed to bad weather), there is a need for a platform that is easy to maintain and able to avoid and/or prevent the accumulation of dirt that may interfere with the operation of the platform.

Among the materials used to manufacture the weighing platforms found in the market, we have, as a first example, wood. However, there are some limiting factors in the use of wood for the manufacturing of platforms. Firstly, there is the high cost of the material and the manufacturing process. Secondly, after a certain duration of use, the wood begins to warp, i.e., to deform itself, making it difficult or even impossible to use the platform. In addition, the wooden platforms present great difficulty for cleaning, since the dirt sticks and adheres to the material.

In addition to wooden platforms, weighing platforms made of low-resistance polymeric material, such as, for instance, polyethylene, or polypropylene, or the like, can be found on the market. One may observe, however, that low-resistance polymers can warp when applied in an open field, especially due to the temperature to which the platform is subjected, which can reach up to 45° C.

Another alternative is the use of a metal, particularly steel, for the manufacturing of the weighing platform. However, as with other materials found in the state of the art, steel has some limiting factors, such as, for instance, its high rigidity, which prevents the platform from operating properly. Besides the difficulty in its operation, steel, as well as wood, makes hinders the cleaning of the platform, due to the adhesion of dirt to the material.

SUMMARY

The goal of this invention is to provide a weighing platform, in particular for open field applications, which has a functional design capable of imparting a ciliary movement, necessary to hinder and/or prevent dirt from settling on the platform, as well as to provide the necessary resistance for excellent platform durability.

The weighing platform of this invention comprises an innovative shape which contributes to facilitate cleaning operations, making it essentially self-cleaning, and facilitating its installation and maintenance due to its reduced weight.

The goals of this invention are achieved by a weighing platform formed by a base plate, which comprises a first upper surface and a second lower surface, wherein the second surface is provided with a plurality of first bars with a cross-section in a "I" shape, which are arranged parallel to the longitudinal axis and fixed on the second surface, the first bars being aligned in parallel and spaced apart, with the weighing platform being made of fiberglass.

BRIEF DESCRIPTION OF THE DRAWINGS

This invention shall be further described based on an execution example represented in the drawings. The Figures show.

DETAILED DESCRIPTION

FIGS. 1 to 5 illustrate an exemplary embodiment of the weighing platform according to this invention.

Figure 1:
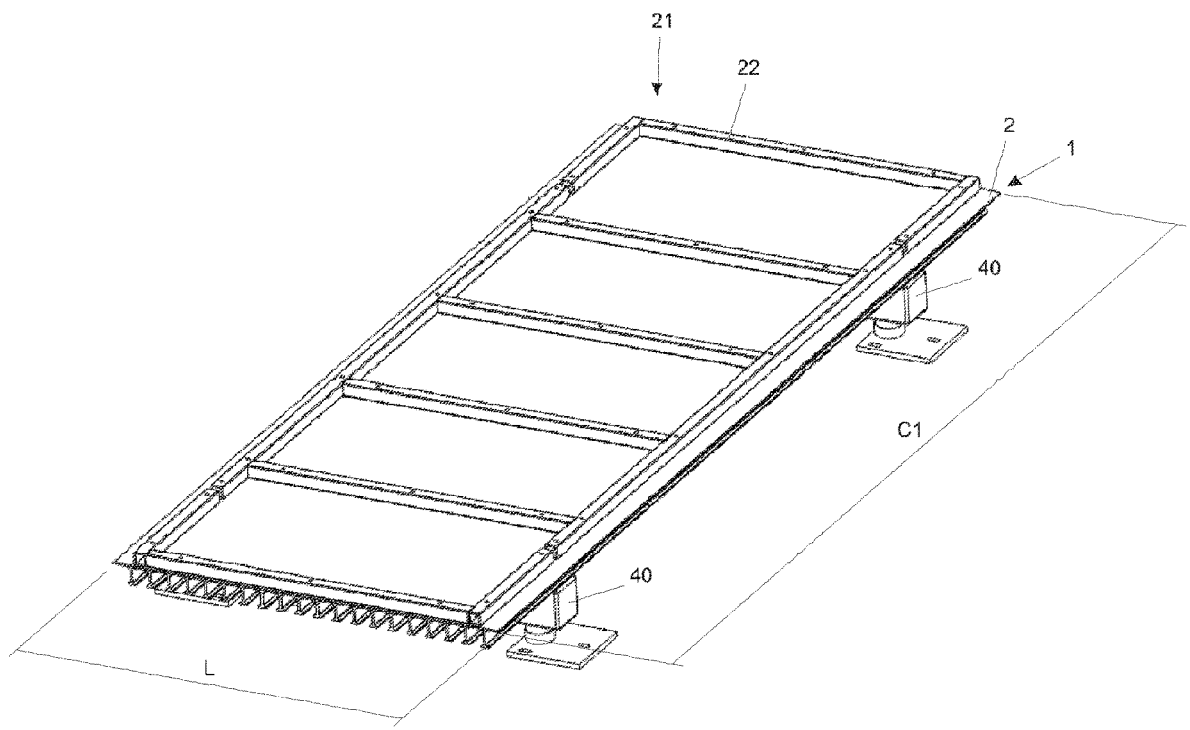
FIG. 1—a first perspective view of the weighing platform of this invention.

FIG. 1 shows a perspective view of the weighing platform of this invention for the weighing of animals, for instance, in the livestock industry.

The weighing platform meets the need of frequently weighing the animals raised, and may be installed at animal crossing points for dynamic weighing or at a fixed place for static weighing so that each animal is led to be weighed when necessary.

Referring to FIG. 1, the platform constitutes a substantially rectangular shaped cross-section base plate 1, when projected in a top view. The base plate 1 may comprise a square, or circular, or cylindrical, or trapezoidal shape, or any other shape suitable for weighing animals, without impairing or altering the proposed technical effect.

The base plate 1 consists of a first upper surface 2, which corresponds to and is to be interpreted as the surface on which the animals pass on to be weighed, and by a second lower surface 3, which corresponds and is to be interpreted as the surface facing the ground. The distance between the first and second surfaces 2,3 defines a thickness of the base plate 1, which can range from a few millimeters to meters in thickness, depending on the application of the platform.

The base plate 1 further comprises a first end surface and a second end surface, so that the distance between the first and second end surfaces defines a first length C1 of the base plate 1. The first length C1 varies between 1800 and 3000 millimeters, being preferably equal to 2000 millimeters.

In addition, the base plate 1 consists of a first side surface and a second side surface, which define a distance from each other corresponding to a width L of the base plate 1. The width L varies between 600 and 1800 millimeters, being preferably equal to 760 millimeters.

The first surface 2 of the base plate 1 is flat and provided with a plurality of tubular profiles 21 with a cross-section of a substantially square shape. The profiles 21 are arranged and secured on the first surface 2 along its longitudinal and transverse length, forming a structure 22 which segments the first surface 2 into rectangular portions adjacent to each other. The structure 22 comprises substantially a train rail format, when viewed from the top. FIG. 1 shows the weighing platform with its first surface 2 facing upwards, showing the structure 22 dividing the first surface 2 into five adjacent rectangular portions formed by the union of the profiles 21. The structure 22 may comprise a square, or trapezoidal, or any other shape that can allow the animals to pass over the first surface 2. The structure 22 may divide the first surface 2 by around five portions, as long as it does not impair the movement of the animals on the platform.

It is further noted in FIG. 1 that the weighing platform of this invention accommodates, under the second surface 3, at least two weighing bars 40. The structure 22 presents a discontinuity in joining the profiles 21 at the attachment points of the weighing bars 40. The discontinuities of the structure 22 are designed to allow the correct fixing of the weighing bars 40 on the weighing platform, as well as to facilitate the flow of water and dirt accumulated on the first surface 2 of the base plate 1. It should be noted that the end portions of the platform, wherein the discontinuities of the structure 22 are provided, refer to the lowering and raising portions of the animal on the platform, being more susceptible to the accumulation of water and dirt.

Figure 2:
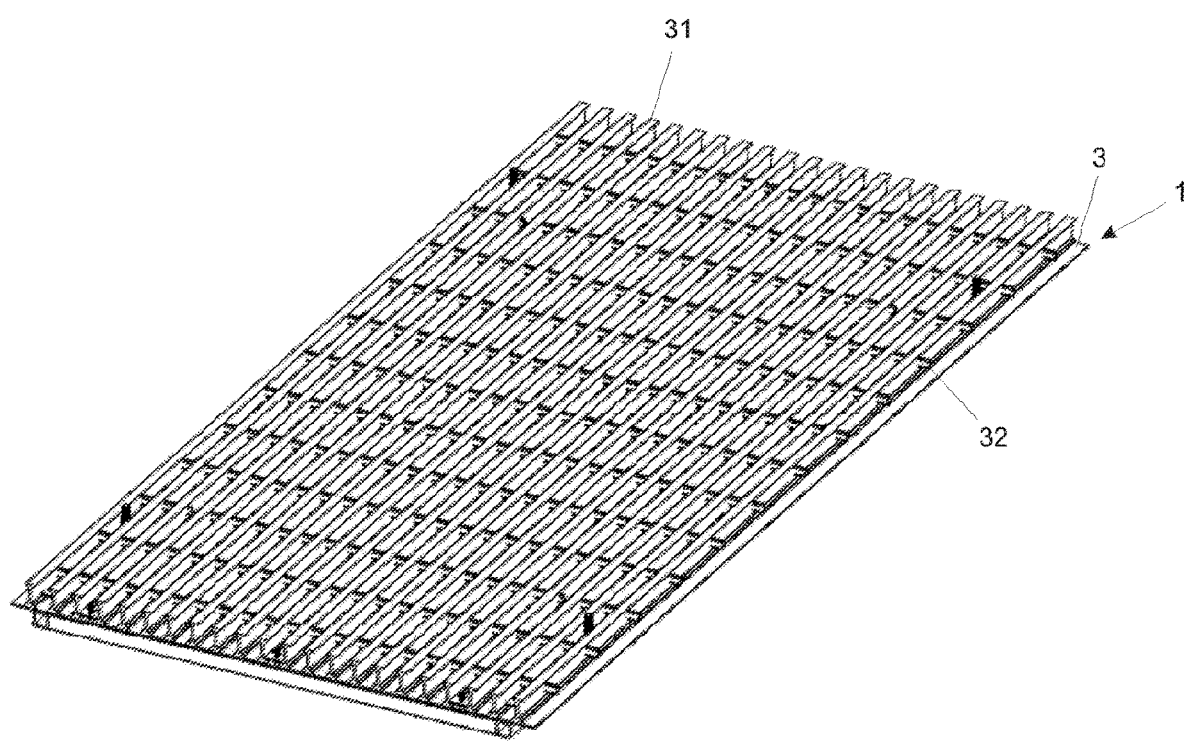
FIG. 2—a second perspective view of the weighing platform of this invention.

In turn, the second surface 3 of the base plate 1 is flat and provided with a plurality of first bars 31 with a substantially I-shaped cross section. The first bars 31 are arranged in parallel to the longitudinal axis and fixed on the second surface 3, being aligned in parallel and spaced from each other. FIG. 2 shows the weighing platform with its second surface 3 facing upwards, showing twenty-two first bars 31 fixed to the second surface 3. Each of the first bars 31 may comprise a height and a varied width, and may be arranged in an amount inferior to or greater than the twenty-two first bars 31 shown, provided that the support is provided and ensures the necessary ciliary movement to the platform.

Figure 3:
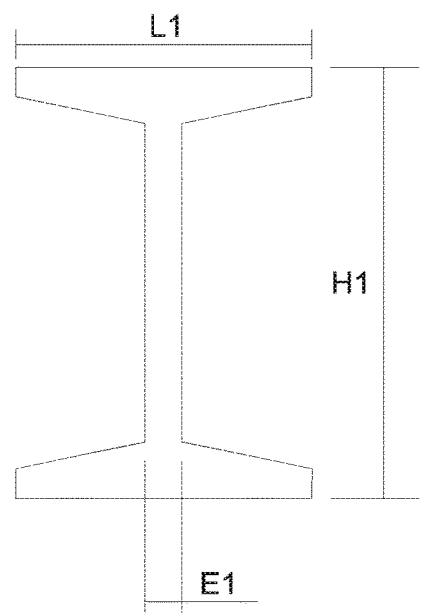
FIG. 3—a front view of the first bars provided on the weighing platform of this invention.

The first I-shaped bars 31 comprise a height H1 ranging from 30 to 100 millimeters, preferably 50 millimeters, and a width L1 ranging from 30 to 50 millimeters, preferably equal to 30 millimeters. In addition, the first bars 31 comprise a web thickness E1 ranging from 6 to 8 millimeters. FIG. 3 shows the cross section of the first bars 31.

The first bars 31 are arranged equally spaced along the width L of the base plate 1, with a minimum amount of first bars 31 being arranged for a base plate 1 of width L equal to 760 millimeters. The amount of first bars 31 may vary according to the width L of the base plate 1 and according to the spacing defined between each of the first bars 31, provided that a minimum amount of at least one first bar 31 is respected every 3.8 mm of the width L of base plate 1. In other words, a spacing of 3.8 mm between the centers of each of the first bars 31 must be respected.

It is further noted that the first bars 31 are joined together by second bars 32 with a substantially circular cross-section arranged orthogonally to the first bars 31 and parallel to the transverse axis of the second surface 3. In the preferred constructive configuration, shown in FIG. 2, thirteen second bars 32 are provided along the longitudinal length of the second surface 3, being aligned in parallel and spaced from each other. The second bars 32 may comprise a varied diameter, and may be arranged in an amount inferior to or greater than the thirteen second bars 32 shown, provided that they comprise a necessary minimum length capable of crossing all the first bars 31 along the transverse length of the second surface 3. The second bars 32 are arranged so as to provide stability and maintain the correct positioning of the first bars 31.

Figure 4:
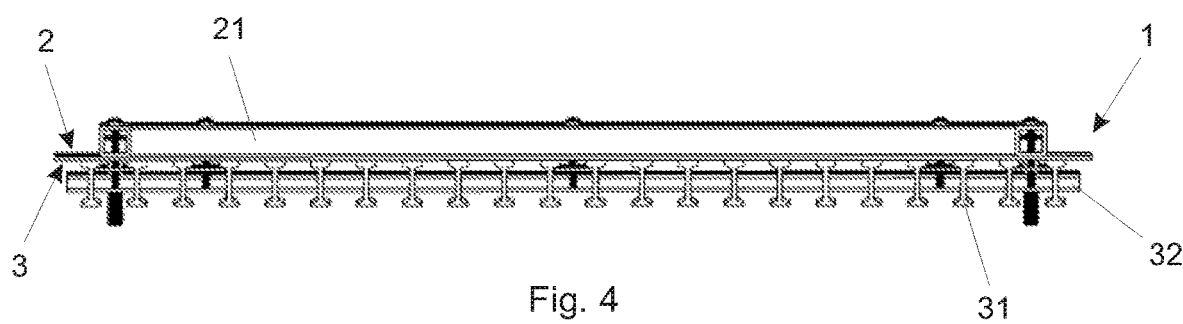
FIG. 4—a front view of the weighing platform of this invention.

FIG. 4 shows a cross-section of the weighing platform, with it being possible to observe the base plate 1, the first and second surfaces 2, 3, as well as the profiles 21 and the first and second bars 31, 32.

The weighing platform is preferably, but not necessarily, made of a polymeric material with high mechanical strength, such as, for instance, fiberglass. The use of fiberglass as a manufacturing material guarantees high resistance to the platform, providing excellent durability compared to other solutions found in the state of the art, as well as facilitating its installation and maintenance due to the reduced weight of the material.

The design formed by the second bars 31 with an I-shaped cross-section imparts a degree of mobility, hereinafter referred to as a ciliary movement, which prevents dirt from adhering to the platform, rendering cleaning processes almost unnecessary and, where necessary, the cleaning operation is greatly facilitated.

Figure 5:
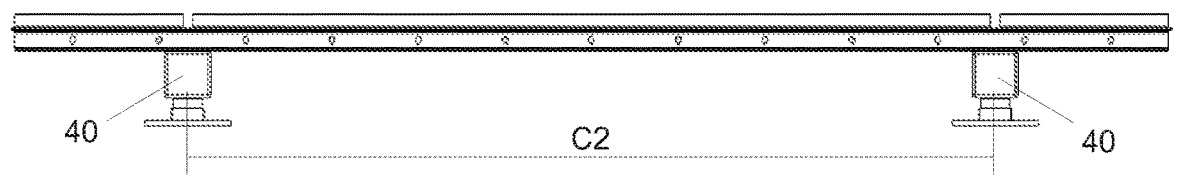
FIG. 5—a side view of the weighing platform of this invention.

In addition to the constructive configuration of the weighing platform itself, the positioning of the weighing bars 40 relative to the platform is also capable of intervening in its correct operation. It is therefore to be understood that the weighing platform of this invention should have a gap between the weighing bars 40 comprising a second length C2 ranging from 1200 to 1700 millimeters, preferably equal to 1400 millimeters, as shown in FIG. 5. This second length C2 is very important because it acts to provide the necessary ciliary movement to the weighing platform.

Furthermore, the base plate 1 protects the first bars 31, but without immobilizing them, ensuring ciliary movement. In turn, the ciliary movement has the function of detaching deposits of soil and organic matter from the surface of the platform, facilitating its cleaning, as well as allowing excellent performance of the load cells with reduced deviations and little need to balance the scale.

The innovative weighing platform of this invention has a functional design, in particular for open field applications, where there is a need for a platform that is easy to clean and capable of avoiding and/or preventing the accumulation of dirt that may interfere with its operation.

In addition, the manufacturing of the fiberglass platform enables the dirt not to adhere to the base plate, so that the platform becomes essentially self-cleaning.

Having described a preferred execution example, one must understand that the scope of this invention encompasses other possible variations, being limited solely by the content of the claims, including possible equivalences.

The invention claimed is:

1. A weighing platform formed by a base plate (1), the base plate (1) including a first upper surface (2) and a second lower surface (3), wherein the second surface (3) is provided with a plurality of first I-shaped cross-section bars (31), which are arranged in parallel to a longitudinal axis and fixed on the second surface (3), with the first bars (31) being aligned in parallel and spaced apart;

wherein the second surface (3) is further provided with a plurality of second bars (32) with a circular cross-section, which are arranged orthogonally to the first bars (31) and parallel to a transverse axis of the second surface (3), with each of the second bars (32) being arranged and provided with a length capable of crossing all the first bars (31) along a transverse length of the second surface (3).

2. The weighing platform according to claim 1, characterized in that the first bars (31) comprise a height (H1) ranging from 30 to 100 millimeters, a width (L1) ranging from 30 to 50 millimeters and a thickness (E1) which varies between 6 and 8 millimeters.

3. A weighing platform according to claim 1, characterized in that the first bars (31) are arranged equally spaced along a width (L) of the base plate (1), with a minimum quantity of at least one first bar (31) every 3.8 millimeters of width (L) from the base plate (1).

4. A weighing platform according to claim 1, characterized in that the first surface (2) is provided with a plurality of tubular profiles (21) having a square cross-section, which are arranged and fixed on the first surface (2) along longitudinal and transverse lengths of the first surface (2), forming a structure (22) that segments the first surface (2) into rectangular portions adjacent to each other.

5. The weighing platform according to claim 1, characterized in that the weighing platform accommodates, under the second surface (3), at least two weighing bars (40), which are arranged spaced apart from each other on a second length (C2) which varies between 1200 and 1700 millimeters.

6. A weighing platform according to claim 1, characterized in that the weighing platform is made of a polymeric material with high mechanical resistance.

7. A weighing platform according to claim 1, characterized in that the weighing platform is made of fiberglass.

8. A weighing platform according to claim 4, wherein discontinuities in the tubular profiles (21) are provided adjacent attachment points of the tubular profiles (21) to weighing bars (40) of the weighing platform.

\* \* \* \* \*